United States Patent
Derendarz et al.

(10) Patent No.: US 10,889,323 B2
(45) Date of Patent: Jan. 12, 2021

(54) METHOD AND DEVICE FOR CARRYING OUT AN AUTOMATIC DRIVE OF A VEHICLE

(71) Applicant: VOLKSWAGEN AKTIENGESELLSCHAFT, Wolfsburg (DE)

(72) Inventors: Wojciech Waclaw Derendarz, Braunschweig (DE); Peter Mühlfellner, Zurich (CH); Sebastian Grysczyk, Braunschweig (DE); Lutz Junge, Braunschweig (DE); Rene Waldmann, Meine (DE); Stefan Wonneberger, Braunschweig (DE); Thomas Holleis, Zurich (CH); Stefan Brüning, Berlin (DE); Sven Horstmann, Berlin (DE); Clemens Brummer, Berlin (DE); Marc Bartholomaeus, Berlin (DE); Martin Stellmacher, Falkensee (DE); Marcel Nicklas, Chemnitz (DE); Fabian Pucks, Berlin (DE); Carsten Last, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 338 days.

(21) Appl. No.: 15/753,584

(22) PCT Filed: Jul. 7, 2016

(86) PCT No.: PCT/EP2016/066112
§ 371 (c)(1),
(2) Date: Feb. 20, 2018

(87) PCT Pub. No.: WO2017/041926
PCT Pub. Date: Mar. 16, 2017

(65) Prior Publication Data
US 2018/0265130 A1 Sep. 20, 2018

(30) Foreign Application Priority Data

Sep. 8, 2015 (DE) .................. 10 2015 011 486
Jun. 22, 2016 (DE) .................. 10 2016 211 180

(51) Int. Cl.
*B62D 15/02* (2006.01)
*G08G 1/16* (2006.01)
(Continued)

(52) U.S. Cl.
CPC ........ *B62D 15/0285* (2013.01); *B60W 30/06* (2013.01); *G05D 1/0285* (2013.01);
(Continued)

(58) Field of Classification Search
CPC .................................................. B62D 15/0285
See application file for complete search history.

(56) References Cited

U.S. PATENT DOCUMENTS 8,170,752 B2  5/2012 Shimazaki et al.
8,797,186 B2 * 8/2014 Pampus .................. G08G 1/14
                                                            340/932.2
(Continued)

FOREIGN PATENT DOCUMENTS

CN  101765527 A  6/2010
CN  102030039 A  4/2011
(Continued)

OTHER PUBLICATIONS

Search Report for German Patent Application No. 10 2016 211 180.9; dated Sep. 11, 2018.
(Continued)

*Primary Examiner* — Alex C Dunn
(74) *Attorney, Agent, or Firm* — Barnes & Thornburg LLP (57) ABSTRACT

A method for carrying out an automatic drive of a vehicle along a provided trajectory which provides at least one
(Continued)

stored trajectory for a current position of the vehicle, selects one of the provided trajectories, and carries out an automatic drive of the vehicle. A control of the vehicle provides signals for a transverse control and a longitudinal control to control the vehicle along the selected trajectory based on detected surroundings data. At least one piece of additional information is detected or received, and the selection process is additionally carried out based on the at least one piece of additional information. Also disclosed is a corresponding device.

32 Claims, 4 Drawing Sheets

(51) Int. Cl.
*G08G 1/14* (2006.01)
*B60W 30/06* (2006.01)
*G05D 1/02* (2020.01)

(52) U.S. Cl.
CPC ............... *G08G 1/14* (2013.01); *G08G 1/144* (2013.01); *G08G 1/168* (2013.01); *G05D 2201/0213* (2013.01)

(56) References Cited

U.S. PATENT DOCUMENTS

| | | | | |
|---|---|---|---|---|
| 9,292,471 | B2* | 3/2016 | Fung | B60K 28/066 |
| 9,683,848 | B2* | 6/2017 | Lavoie | B60W 30/18036 |
| 2006/0287826 | A1* | 12/2006 | Shimizu | B60Q 1/0023 |
| | | | | 701/431 |
| 2007/0219695 | A1* | 9/2007 | Chiu | B60W 50/14 |
| | | | | 701/51 |
| 2010/0156672 | A1* | 6/2010 | Yoo | G08G 1/14 |
| | | | | 340/932.2 |
| 2011/0080304 | A1 | 4/2011 | Toledo et al. | |
| 2011/0093846 | A1* | 4/2011 | Moinzadeh | G06F 9/451 |
| | | | | 717/178 |
| 2011/0273310 | A1* | 11/2011 | Kadowaki | B62D 15/0285 |
| | | | | 340/932.2 |
| 2012/0188100 | A1* | 7/2012 | Min | E04H 6/426 |
| | | | | 340/932.2 |
| 2013/0085637 | A1* | 4/2013 | Grimm | G05D 1/00 |
| | | | | 701/25 |
| 2015/0025732 | A1 | 1/2015 | Min et al. | |
| 2015/0217763 | A1* | 8/2015 | Reichel | B60W 50/08 |
| | | | | 701/23 |
| 2016/0110619 | A1* | 4/2016 | Kim | B60W 30/06 |
| | | | | 382/104 |
| 2016/0207527 | A1* | 7/2016 | Hiei | B60W 50/10 |
| 2016/0368489 | A1* | 12/2016 | Aich | B60T 7/18 |
| 2017/0129486 | A1* | 5/2017 | Nakada | B60W 10/20 |

FOREIGN PATENT DOCUMENTS

| | | |
|---|---|---|
| DE | 102008027779 A1 | 12/2009 |
| DE | 102010049585 A1 | 4/2012 |
| DE | 102011103096 A1 | 12/2012 |
| DE | 102011109492 A1 | 2/2013 |
| DE | 102011113916 A1 | 3/2013 |
| DE | 102012201495 A1 | 8/2013 |
| DE | 102012014207 A1 | 1/2014 |
| DE | 102013015348 A1 | 4/2014 |
| DE | 102013015349 A1 | 4/2014 |
| DE | 102013020699 A1 | 5/2015 |
| WO | 2015096838 A1 | 7/2015 |

OTHER PUBLICATIONS

Search Report for International Patent Application No. PCT/EP2016/066112, dated Oct. 7, 2016.

* cited by examiner

METHOD AND DEVICE FOR CARRYING OUT AN AUTOMATIC DRIVE OF A VEHICLE

PRIORITY CLAIM

This patent application is a U.S. National Phase of International Patent Application No. PCT/EP2016/066112, filed 7 Jul. 2016, which claims priority to German Patent Application Nos. 10 2015 011 486.7, filed 8 Sep. 2015, and 10 2016 211 180.9, filed 22 Jun. 2016, the disclosures of which are incorporated herein by reference in their entireties.

SUMMARY

Illustrative embodiments relate to a method and a device for carrying out an automatic drive of a vehicle along a prepared trajectory.

BRIEF DESCRIPTION OF THE DRAWINGS

Hereafter, the disclosed embodiments are described in greater detail with reference to the figures, in which.

DETAILED DESCRIPTION

Modern vehicles, in particular motor vehicles, have a plurality of assistance systems, which assist a driver when driving the vehicle. Such systems as braking assistants, lane keeping assistants and distance maintaining assistants are used.

Methods are also known for guiding a vehicle automatically along a prepared trajectory into a parking position. For this purpose, the steering and the drive system of the vehicle are controlled by a control system in such a way that the vehicle is automatically guided along the trajectory into the parking position. Such a method is known, for example, from DE 10 2013 015 349 A1.

Document DE 10 2013 015 348 A1 discloses a method for operating a vehicle, in particular, for approaching a parking space by the vehicle in a parking zone which is unobservable/remote from the road, in which environmental data of the vehicle are recorded, wherein on approaching a parking place in the parking zone it is identified whether this is a home car parking space or the parking zone of a home parking zone, and in the case of a home parking space or home parking zone being identified and a proximity of the vehicle to the identified home parking space and/or the identified home parking zone, detected environmental data are stored or updated, wherein in a training mode, on the basis of the environmental data or driving data a plurality of trajectories for the at least one home parking space of the at least one home parking zone are determined and stored, and wherein in an operating mode when approaching the at least one home parking space of the at least one home parking zone, possible drivable trajectories are output for selection and activation, or, if only one of the determined trajectories is drivable, this is automatically activated.

The disclosed embodiments solve the technical problem of creating a method and a device for carrying out an automatic drive of a vehicle, in which the selection of a stored trajectory is improved.

This is achieved by the disclosed method and the disclosed device.

In the following a trajectory shall comprise an ordered set of parameterized position data of a path curve in an environment, plus additional data. These additional data can be features present in the environment and/or features derived therefrom, for example, visual images, metadata or positional data of physical objects in the environment. The additional data are intended to allow improved localization of the vehicle in the environment, in particular, in comparison to satellite-based global positioning and navigation systems (e.g., GPS).

In the following, a pose will be used to designate both a position and an orientation of a vehicle. An orientation will indicate whether a vehicle is parked or is intended to be parked in a parking space facing forwards or backwards.

In the following, a vehicle will designate a motor vehicle for transporting persons or goods.

The background of the disclosure is formed by assistance systems which enable a vehicle to learn a trajectory in a training drive and to traverse the learned trajectory automatically in a subsequent drive. The situation will be considered in which prior to performing the subsequent drive a stored trajectory must be selected to define the target position to which the vehicle is to be automatically driven.

The core idea of the disclosure is to improve the selection in the context of the trajectory to be driven during the automated drive, by a piece of additional information being also collected or received. The additional piece of information thus represents an additional parameter, which is taken into account in the selection. If multiple trajectories are stored for a current position or a current environment, then for the time being, all stored trajectories are made available. The additional information can then, for example, restrict the selection of the trajectories provided only in the sense of a filter. But it can also be provided that the additional information is used as a parameter for modifying a trajectory provided. This is the case, for example, if none of the stored trajectories are satisfied directly by the requirements imposed by the additional piece of information. A provided trajectory is then adapted, for example, in such a way that the requirements of the additional piece of information are satisfied by the adapted trajectory. The benefit obtained is that the selection can be carried out in a more targeted and flexible manner.

A method for performing an automated drive of a vehicle along a prepared trajectory is provided, comprising the following operations: providing at least one stored trajectory for a current position of the vehicle, selecting one of the provided trajectories, performing an automated drive of the vehicle, wherein a control unit of the vehicle, on the basis of collected environment data, provides signals for a transverse control and a longitudinal control for controlling the vehicle along the selected trajectory, wherein at least one piece of additional information is detected or received, and the selection process is additionally carried out on the basis of the at least one piece of additional information.

A device for carrying out an automated drive of a vehicle along a provided trajectory is also created, comprising at least one environmental detection device for detecting environmental data of an environment of the vehicle, a control unit for providing at least one stored trajectory for a current position of the vehicle and selecting one of the provided trajectories, wherein the control unit is designed to provide, based on the detected environmental data, signals for a transverse control and a longitudinal control for controlling the vehicle along the selected trajectory, wherein the control unit is also designed to detect or to receive at least one piece of additional information and in addition to perform the selection on the basis of the at least one piece of additional information.

When selecting one of the provided trajectories, it may be desirable that an orientation of the vehicle to the target position of the selected trajectory can be selected. In a disclosed embodiment, it is provided that the at least one piece of additional information is a predefined pose of the vehicle to a target position of the trajectory. Thus, for example, it can be chosen whether the vehicle is to be parked forwards or in reverse. Furthermore, for example, an offset relative to a target position which is stored for the corresponding trajectory can be additionally specified. This is beneficial, for example, if the vehicle is to be parked in a garage, unlike as originally trained. The control unit then modifies one of the provided trajectories and then carries out the automated drive.

It may also be desirable that only certain trajectories can be selected from the stored trajectories for a current position or an environment of the vehicle. For example, it can be provided that the stored trajectories are each assigned a user identifier or a vehicle identifier. During a subsequent drive only trajectories, which are marked with the appropriate user identifier or vehicle identifier, will then be selectable. In a further disclosed embodiment, it is provided that individualization items of information are assigned to the stored trajectories and the at least one piece of additional information alternatively or in addition, is an individualization information item. The individualization information item can be, for example, a user identifier, a user account, a vehicle identifier or else an identifier that identifies a specific group of vehicles or drivers. In this way, stored trajectories can be selectively provided and selected.

It may also be desirable that, depending on a current occupancy status of the target position of a provided trajectory, an alternative target position should be selected. In a disclosed embodiment, it is provided that the at least one piece of additional information is alternatively or additionally a predefined ranking of target positions of the provided trajectories. This allows the specification of a ranking of a plurality of trajectories and their associated target positions. For example, the following ranking can be provided, depending on the current occupancy status of the individual target positions: firstly, the vehicle should be parked in the left-hand garage, then it should be parked in the right-hand garage, then in front of the left garage and finally in front of the right garage. Depending on the present occupancy status, the individual ranks of the ranking are then traversed.

The ranking may also be specified according to other criteria, however. This can be, for example, a benefit or cost factor of the provided trajectories. For example, a required number of rearrangement operations, which is necessary to implement a corresponding target position of a provided trajectory is assigned a corresponding cost value. Such a cost value can be, for example, an energy consumption calculated by a cost function, or a required time. The more rearrangement operations are necessary, the higher the cost value, and the lower the corresponding trajectory is placed in the ranking. At least one disclosed embodiment thus provides a minimization of the necessary energy.

It can also be provided that the selection of a stored trajectory is performed based on the environment of the vehicle and/or the target position of the provided trajectories. In a further disclosed embodiment, it is provided that the at least one piece of additional information is a specified minimum distance of the vehicle to an obstacle at a particular target position of the provided trajectories. For example, it can be provided that the minimum distance to an obstacle in a garage on the right-hand and on the left-hand side of the vehicle should be at least one meter. If, for example, the environment detecting device then detects a bicycle positioned against the left-hand garage wall, so that it is not possible to park the vehicle in the garage while maintaining the minimum distance of one meter, then the provided trajectory for the left-hand garage is not selected.

If none of the provided trajectories meets the specifications of the at least one piece of additional information, then provision can be made to modify one of the provided trajectories on the basis of the at least one additional criterion. In a disclosed embodiment, it is provided that one of the provided trajectories is modified by the control unit on the basis of the at least one piece of additional information, if selecting one of the provided trajectories is not possible on the basis of the at least one piece of additional information. If, for example, for parking in a garage only one trajectory is stored and provided for a forward parked vehicle, but it is desired to park the vehicle in reverse, then in the absence of an alternative trajectory the trajectory is adapted accordingly. The control unit checks whether such an adjustment is possible in the environment of the vehicle, because it might be necessary to perform a turning maneuver of the vehicle. If the adjustment is possible, the provided trajectory for the forward parked vehicle is modified such that the vehicle is reverse parked into the garage.

The detection or reception of the at least one piece of additional information can be performed automatically without the influence of a driver or passenger of the vehicle. In a disclosed embodiment, it is provided that the at least one piece of additional information is provided by the control unit of the vehicle. Thus, for example, the control unit can be connected to a memory, in which the at least one piece of additional information, for example, a ranking of different stored trajectories stored there, is stored. If, for example, on the basis of the current position of the vehicle it is detected that driving is to take place automatically, then the memory provides the at least one piece of additional information. The control unit receives this and selects one of the provided trajectories accordingly.

It is also possible that the control unit of the vehicle retrieves the at least one piece of additional information from a server implemented outside the vehicle. The server then provides the at least one additional piece of information to the control unit and transmits it to the control unit.

It can also be provided, however, that the at least one piece of additional information is detected by a user interaction. Therefore, in at least one disclosed embodiment, it is provided that the at least one additional piece of information is detected by a user interaction. The user interaction can be, for example, a recorded manual input. The input may have been performed at an earlier point in time, for example, already during the learning of one or more trajectories for an environment. The input can also be requested again each time directly before a subsequent drive that is to be carried out in the environment.

In a disclosed embodiment, it is provided that the user interaction is recorded on a display and operating device. Such a display and operating device can be, for example, a multimedia console installed in the vehicle.

It is also possible, however, that the display and operating device is not part of the vehicle, but is implemented in a smartphone or a tablet computer. The user interaction is then accordingly recorded on the smartphone or tablet computer. For example, a corresponding user interaction can be initiated by the control unit of the vehicle and then transmitted to the smartphone or tablet computer over a communication link as a query. The driver or a passenger can then answer the query by an appropriate input on the smartphone or the tablet computer. The additional information is then transmitted back to the control system by the smartphone or the tablet computer via the communication link.

A user interface should be designed to be maximally interactive and immediately understandable for a user. In a disclosed embodiment, it is provided that before recording the user interaction, provided trajectories are presented on the display and operating device. In this way, a driver or a passenger can intuitively discover which trajectories are provided and which options for selecting or customizing the provided trajectories are available.

In this process it may be desirable to combine trajectories, which describe the same route sections. In a further disclosed embodiment, provided trajectories, which have common route sections but different target points, are grouped together to form common master trajectories with individual branch trajectories, wherein the stored trajectories on the display and operating device are presented as master trajectories and branch trajectories.

In a further disclosed embodiment, it is provided that decision points are defined at branching points of the master trajectory into individual branch trajectories, at each of which a selection of the branch trajectory to be driven is made on the basis of the at least one piece of additional information. This allows a flexible selection of one of the provided trajectories.

In a disclosed embodiment, it is also provided that the provided trajectories are displayed in a three-dimensional elevation of an environment of the vehicle on the display and operating device. This enables the provided trajectories to be displayed in a clear manner.

If one of the provided trajectories is selected, then the automated drive along the selected trajectory is carried out. During the automated drive, the environment of the vehicle can change. In this case it may happen that a target position of the selected trajectory is (again) occupied. Therefore, in a disclosed embodiment, it is provided that when carrying out the automated drive along the selected trajectory it is continuously monitored by the control unit, whether a target position of the selected trajectory is available or assigned, and wherein an alternative trajectory is selected from other provided trajectories, each with alternative target positions, on the basis of the at least one piece of additional information, if the target position is occupied. Thus, even after a first selection of a provided trajectory a further selection is enabled. If, for example, a plurality of trajectories are provided but the first selected trajectory is not feasible, because its target position is (again) occupied, then for example, on the basis of the same additional information a selection of an alternative trajectory can be made.

It is provided that the monitoring of the availability of the target position of the selected trajectory is carried out by an environmental detection device of the vehicle and/or via a query to a server. Such an environmental detection device can be, for example, a camera, a radar, an ultrasonic sensor, a top-view camera or a LIDAR. The server can provide, for example, via a communication connection, appropriate environmental data or an occupation status for the target position.

In the case of a trajectory tree, different branches can therefore be traversed. If, for example, a target position of a branch trajectory is occupied (again), then a different branch trajectory is chosen. It can also be provided that a branch trajectory can be automatically retraced up to a decision point, at which another alternative branch trajectory begins and is thus available.

In addition, it is also possible that a non-viable branch trajectory tree of the trajectory tree is modified by the control unit as described above.

Figure 1:
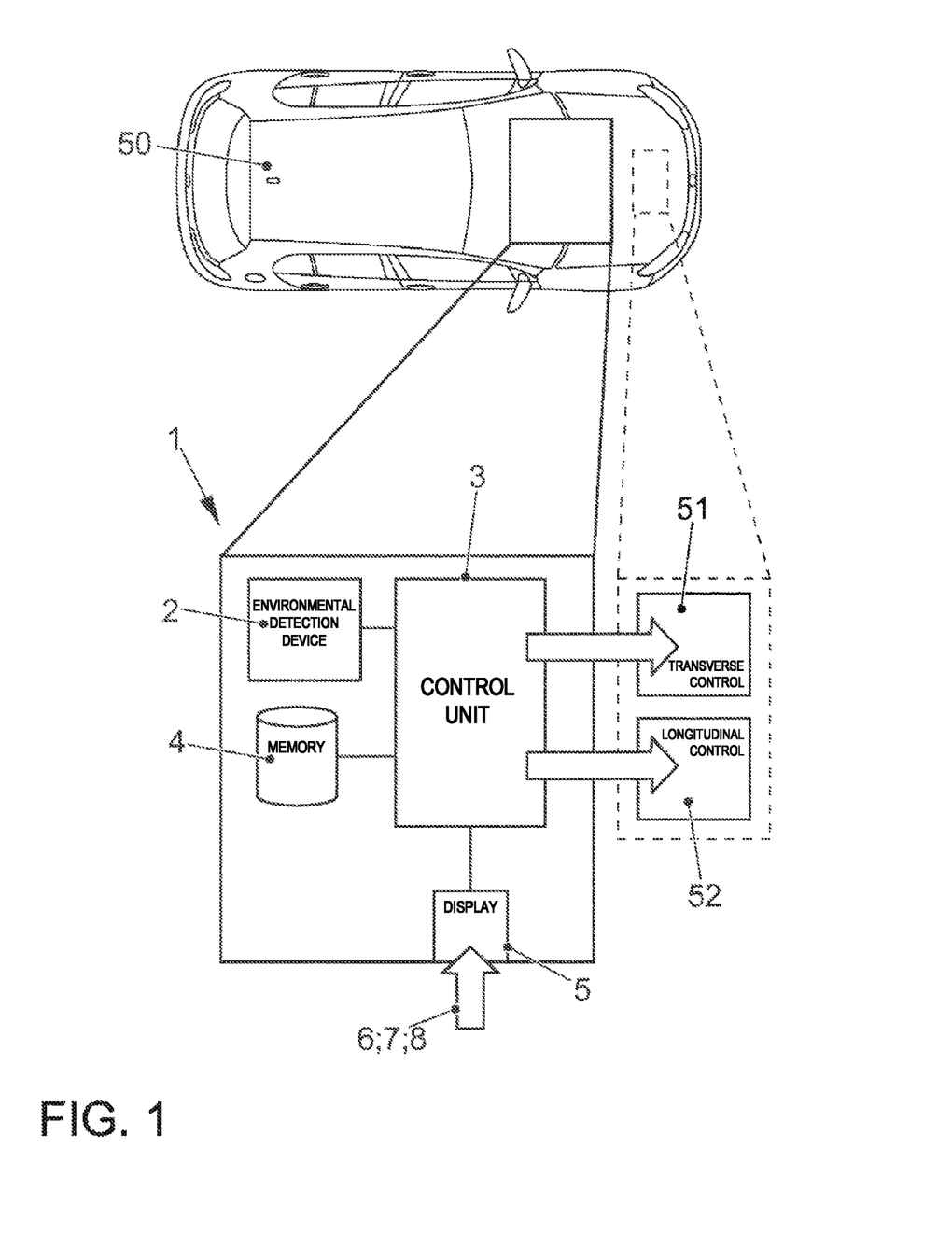
FIG. 1 is a schematic representation of an embodiment of a device for carrying out an automated drive of a vehicle.

FIG. 1 shows a schematic representation of an embodiment of a device 1 for carrying out an automated drive of a vehicle 50. The device 1 comprises an environmental detection device 2 for detecting an environment of the vehicle 50. The device 1 also comprises a control unit 3, a memory 4, and a display and operating device 5.

Alternatively, the display and operating device 5 can be implemented not as part of the device 1 but outside of it, for example, in a smartphone or a tablet computer. The display and operating device 5 is then connected via a communication link to the control unit 3.

To control the vehicle 50 along a provided trajectory, the control unit 3 is designed to provide signals for a transverse control 51 and a longitudinal control 52 of the vehicle 50.

In the memory 4, trajectories for an environment of the vehicle 50 that were learned, for example, in a training drive are stored. The environment detection device 2 detects a current environment of the vehicle 50 and provides collected environmental data to the control unit 3. From this data, the control unit 3 determines a current position of the vehicle and retrieves the trajectories stored in the memory 4 for a subsequent journey and makes them available for selection.

Then the control unit 3 initiates the querying of a user interaction 6 on the display and operating device 5 for capturing at least one piece of additional information 7. The display and operating device 5 detects the user interaction 6 and derives the at least one piece of additional information 7 from this. The at least one piece of additional information 7 can be, for example, a desired pose 8 of the vehicle 50 at the target position of the provided trajectories. In addition, a target position or trajectory can also be selected, such as for parking in a garage. The control unit 3 receives the at least one piece of additional information 7 and selects one of the provided trajectories on the basis of the at least one piece of additional information 7.

The control unit 3 then executes an automatic drive along the selected trajectory.

Figure 2:
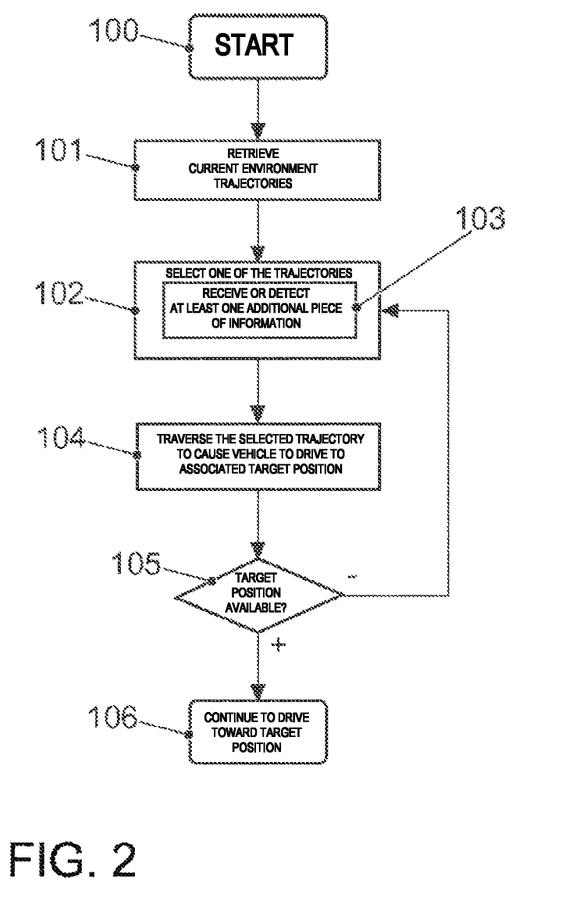
FIG. 2 is a schematic flow chart of a method for carrying out an automated drive of a vehicle.

FIG. 2 shows a schematic flow chart of a method for carrying out an automated drive of a vehicle. The method is started 100 when a subsequent drive is to be carried out.

In a first method operation at 101, stored trajectories for a current environment are retrieved, for example, from a memory, and made available.

In the next method operation at 102, one of the provided trajectories is then selected. In a method operation at 103 at least one piece of additional information is detected or received. The at least one piece of additional information can be derived, for example, from a recorded user interaction or can be received by retrieval from a memory. Selection of one of the provided trajectories is then carried out on the basis of the at least one piece of additional information.

In the next method operation at 104, the selected trajectory is traversed, so that the vehicle is driven to an associated target position.

Optionally, in a method operation at 105 it can be continuously monitored whether the target position of the selected trajectory is still available or is (again) occupied. If the target position is available, the automated drive along the trajectory is continued. If, on the other hand, the target position of the selected trajectory is (again) occupied, then an alternative will be selected from the provided trajectories, so that the method operations at 102 to 104 are performed again.

Figure 3:
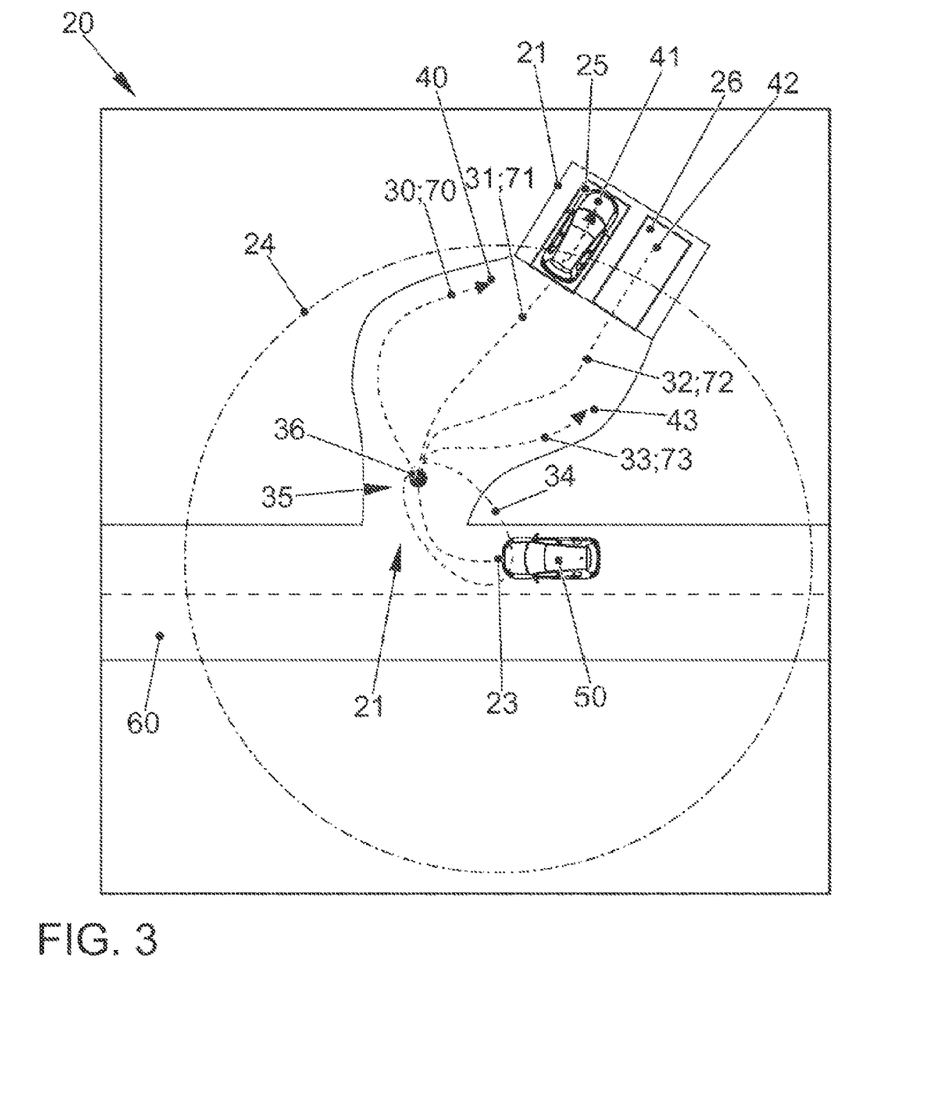
FIG. 3 is a schematic situation before parking in a double garage to illustrate the method.

In FIG. 3, to illustrate the method a schematic situation 20 of an arrival of a vehicle 50 from a road 60 onto a property entrance 21 is shown. Here, for example, four different trajectories 30, 31, 32, 33 have been learned in previous training journeys, each of which lead to different target positions 40, 41, 42, 43. The trajectories 30, 31, 32, 33 are, for example, stored in a memory. The trajectories 30, 31, 32, 33 all have the same master trajectory 34 and can therefore be combined to form a trajectory tree 35, which is subdivided into a plurality of branch trajectories 70, 71, 72, 73. At the point where the branching point of the master trajectory 34 is formed, there is a decision point 36, at which a selection must be made.

An environment detection device in the vehicle 50 detects an environment 24 of the vehicle 50, from which a control unit determines a current position 23 of the vehicle 50 in the environment 24.

The control unit then retrieves from the memory the trajectories 30, 31, 32, 33 stored for the calculated current position 23, or for the environment 24 respectively, and makes these available for selection.

The selection process is then performed in accordance with the method described above on the basis of at least one piece of additional detected or received information. Such a piece of additional information can be, for example, a predefined ranking of the provided trajectories 30, 31, 32, 33 and/or the associated target positions 40, 41, 42, 43. Thus, for example, it can be provided that the ranking makes the following provision: first the vehicle should be parked in the left-hand garage 25 (trajectory 31, target position 41); if this is not possible then it should be parked in a right-hand garage 26 of the double garage 22 (trajectory 32, target position 42); if this is not possible either, it should be parked in front of the left-hand garage 25 (trajectory 30, target position 40); and if even this is not possible, it should be parked in front of the right-hand garage 26 (trajectory 33, target position 43).

Accordingly, in a first selection the vehicle should be parked in the left-hand garage 25.

If when performing the automated drive along the trajectory 31, for example, it is discovered that the left-hand garage 25 is already occupied, then the trajectory 32 for parking in the right-hand garage 26 is selected, etc. It can be provided that a part of the trajectory 31 is traversed in reverse again until the decision point 36, at which the master trajectory 34 of the trajectory tree 35 splits into the individual branch trajectories 70, 71, 72, 73. Here, the next trajectory 32 is then accordingly selected in order of precedence and is automatically traversed.

Furthermore, the at least one piece of additional information can also be a desired orientation of the vehicle 50. For example, the trajectory 31 stored for the left-hand garage 25 can provide that the vehicle 50 is parked facing forwards; whereas the trajectory 32 stored for parking in the right-hand garage 26 can provide that the vehicle 50 is reverse parked. If it is now required by the piece of additional information detected or received that the vehicle 50 should be parked forwards, for example, because the driver wants the luggage compartment of the vehicle 50 to be loaded or unloaded, then the trajectory 31 together with the target position 41 in the left-hand garage 25 is selected.

Figure 4:
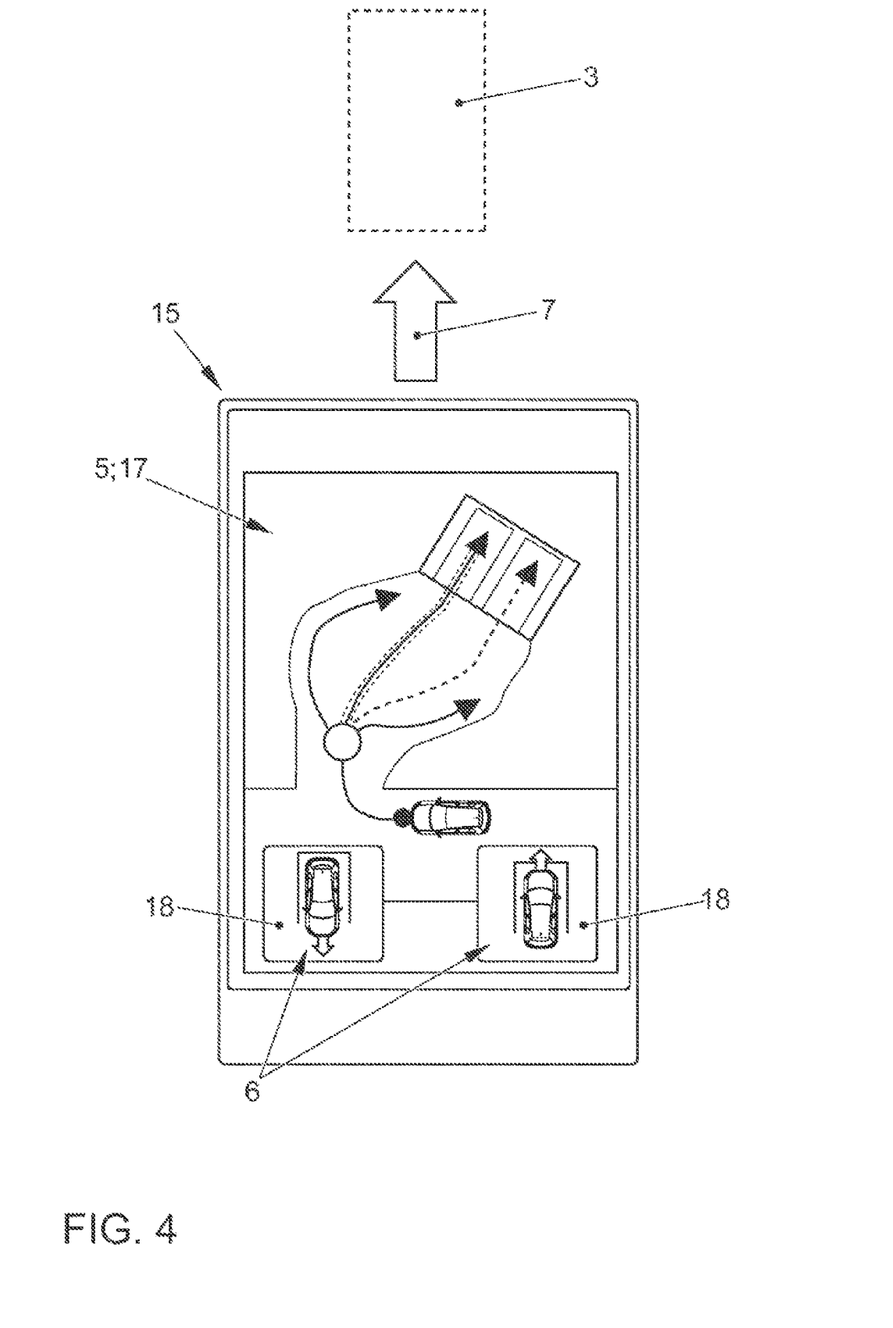
FIG. 4 is a schematic representation of a smartphone for detecting a piece of additional information by a user interaction.

FIG. 4 shows a schematic representation of a smartphone 15 for detecting a piece of additional information by a user interaction 6. In this case, on a display and operating device 5 of the smartphone 9 a schematic view 17 of the environment of the vehicle is displayed. As an example, the detection of a desired pose (forward or reverse parking) by a user interaction 6 is illustrated. The user interaction 6 comprises an activation of virtual control elements 18 on the display and operating device 5. A user, such as a driver or passenger of the vehicle 50, can select the desired pose by activating one of the virtual control elements 18. The result of the user interaction 6 is then made available as additional information 7 and transmitted, for example, via a mobile wireless or WLAN connection, to a control unit 3 of a device of the vehicle as described in FIG. 1, using appropriately designed communication mechanisms.

LIST OF REFERENCE NUMERALS 1 device
2 environment detection device
3 control unit
4 memory
5 display and operating device
6 user interaction
7 additional information
8 pose
15 smartphone
17 view of the environment
18 virtual control element
20 situation
21 property entrance
22 double garage
23 current position
24 environment
25 left-hand garage
26 right-hand garage
30 trajectory
31 trajectory
32 trajectory
33 trajectory
34 master trajectory
35 trajectory tree
36 decision point
40 target position
41 target position
42 target position
43 target position
70 branch trajectory
71 branch trajectory
72 branch trajectory
73 branch trajectory
50 vehicle
51 transverse control
52 longitudinal control
100-106 method operations

The invention claimed is:

1. A method for carrying out automated driving of a transportation vehicle along a provided trajectory, the method comprising:
providing at least one stored trajectory for a current position of the transportation vehicle;
displaying the at least one stored trajectory on a display and operating device;

receiving input indicating a selection, by a user, of one of the at least one stored trajectories displayed on the display; and carrying out automatic driving of the transportation vehicle, wherein a control unit of the transportation vehicle provides signals for a transverse control and a longitudinal control to control the transportation vehicle along the selected, stored trajectory based on detected environment data.

2. The method of claim 1, wherein the at least one piece of additional information is a specified pose of the transportation vehicle at a target position of the trajectory.

3. The method of claim 1, wherein items of individualization information are assigned to the stored trajectories, and the at least one piece of additional information is alternatively or additionally an individualization information item.

4. The method of claim 1, wherein the at least one piece of additional information is alternatively or additionally a predetermined ranking of target positions of the stored trajectories.

5. The method of claim 1, wherein the at least one piece of additional information is a specified minimum distance of the transportation vehicle from an obstacle at a target position of the stored trajectories.

6. The method of claim 1, wherein the at least one additional piece of information is a current occupation status of target positions of the stored trajectories.

7. The method of claim 1, wherein one of the stored trajectories is modified by the control unit based on the at least one piece of additional information in response to a selection of one of the stored trajectories based on the at least one piece of additional information not being possible.

8. The method of claim 1, wherein the at least one piece of additional information is provided by the control unit of the transportation vehicle.

9. The method of claim 1, wherein the at least one piece of additional information is detected by means of a user interaction.

10. The method of claim 9, wherein the user interaction is detected on the display and operating device.

11. The method of claim 10, wherein, the detecting of the user interaction occurs after the stored trajectories are displayed on the display and operating device.

12. The method of claim 11, wherein stored trajectories, which have common sections of route but different target points, are combined to form common master trajectories with individual branch trajectories, wherein the stored trajectories are displayed on the display and operating device as master trajectories and branch trajectories.

13. The method of claim 12, wherein decision points are defined at branching points of the master trajectory into individual branch trajectories, at each of which a selection of the branch trajectory to be driven along is made based on the at least one piece of additional information.

14. The method any one of claims of claim 11, wherein the stored trajectories are displayed in a three-dimensional view of an environment of the transportation vehicle on the display and operating device.

15. The method of claim 1, wherein, while carrying out the automated drive along the selected trajectory, the control unit continuously monitors whether a target position of the selected trajectory is available or occupied, and wherein an alternative trajectory is selected from other stored trajectories, each with alternative target positions, based on the at least one piece of additional information, in response to the target position being occupied.

16. The method of claim 15, wherein the monitoring of the availability of the target position of the selected trajectory is carried out by an environment detection device of the vehicle and/or by means of a query to a server.

17. A device for performing automated driving carrying out an automated drive of a transportation vehicle along a provided trajectory, the device comprising:

at least one environment detection device for detecting environmental data of an environment of the transportation vehicle; and a control unit for providing at least one stored trajectory for a current position of the transportation vehicle for display on a display and operating device and for selecting, by a user, one of the stored trajectories displayed on the display, wherein the control unit provides, based on the detected environmental data and received input indicating a selection by the user, signals for a transverse control and a longitudinal control for controlling the transportation vehicle along the selected trajectory.

18. The device of claim 17, wherein the at least one piece of additional information is a specified pose of the transportation vehicle at a target position of the trajectory.

19. The device of claim 17, wherein items of individualization information are assigned to the stored trajectories, and the at least one piece of additional information is alternatively or additionally an individualization information item.

20. The device of claim 17, wherein the at least one piece of additional information is alternatively or additionally a predetermined ranking of target positions of the stored trajectories.

21. The device of claim 17, wherein the at least one piece of additional information is a specified minimum distance of the transportation vehicle from an obstacle at a target position of the stored trajectories.

22. The device of claim 17, wherein the at least one additional piece of information is a current occupation status of target positions of the stored trajectories.

23. The device of claim 17, wherein one of the stored trajectories is modified by the control unit based on the at least one piece of additional information in response to a selection of one of the stored trajectories based on the at least one piece of additional information not being possible.

24. The device of claim 17, wherein the at least one piece of additional information is provided by the control unit of the transportation vehicle.

25. The device of claim 17, wherein the at least one piece of additional information is detected by a user interaction.

26. The device of claim 25, wherein the user interaction is detected on the display and operating device.

27. The device of claim 26, wherein, the detection of the user interaction is performed after the display of the stored trajectories on the display and operating device.

28. The device of claim 27, wherein stored trajectories, which have common sections of route but different target points, are combined to form common master trajectories with individual branch trajectories, wherein the stored trajectories are displayed on the display and operating device as master trajectories and branch trajectories.

29. The device of claim 27, wherein decision points are defined at branching points of the master trajectory into individual branch trajectories, at each of which a selection of the branch trajectory to be driven along is made based on the at least one piece of additional information.

30. The device of claim 27, wherein the stored trajectories are displayed in a three-dimensional view of an environment of the transportation vehicle on the display and operating device.

31. The device of claim 17, wherein, while carrying out the automated drive along the selected trajectory, the control unit monitors whether a target position of the selected trajectory is available or occupied, and wherein an alternative trajectory is selected from other stored trajectories, each with alternative target positions, based on the at least one piece of additional information, in response to the target position being occupied.

32. The device of claim 31, wherein the monitoring of the availability of the target position of the selected trajectory is carried out by an environment detection device of the vehicle and/or by a query to a server.

* * * * *